(12) United States Patent
Tarelli et al.

(10) Patent No.: US 11,418,100 B2
(45) Date of Patent: Aug. 16, 2022

(54) HAPTIC ACTUATOR HAVING A DOUBLE-WOUND DRIVING COIL FOR TEMPERATURE-INDEPENDENT VELOCITY SENSING

(71) Applicant: Apple Inc., Cupertino, CA (US)

(72) Inventors: Riccardo Tarelli, San Francisco, CA (US); Yumeng Liu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 245 days.

(21) Appl. No.: 16/900,591

(22) Filed: Jun. 12, 2020

(65) Prior Publication Data
US 2020/0412222 A1  Dec. 31, 2020

Related U.S. Application Data

(60) Provisional application No. 62/861,951, filed on Jun. 14, 2019.

(51) Int. Cl.
| | | |
|---|---|---|
| *H02K 33/12* | (2006.01) | |
| *H02P 7/02* | (2016.01) | |
| *H02P 23/14* | (2006.01) | |
| *H02P 25/032* | (2016.01) | |
| *H02P 25/22* | (2006.01) | |
| *B06B 1/04* | (2006.01) | |

(52) U.S. Cl.
CPC .............. *H02K 33/12* (2013.01); *H02P 7/02* (2016.02); *H02P 23/14* (2013.01); *H02P 25/032* (2016.02); *H02P 25/22* (2013.01); *B06B 1/045* (2013.01)

(58) Field of Classification Search
CPC ........ H02P 25/00; H02P 25/032; H02P 25/08; H02P 25/06; H02P 25/062; H02P 25/064; H02P 27/00; H02P 27/04; H02P 27/06; H02P 27/08; H02P 29/67; H02P 2207/05; H02P 21/22; H02P 7/29; H02P 6/157; H02P 6/182; H02P 6/28; H02P 1/00; H02P 1/04; H02P 1/24; H02P 1/26; H02P 1/42; H02P 1/46; H02K 33/12; B06B 1/045; G06F 3/016
See application file for complete search history.

(56) References Cited

U.S. PATENT DOCUMENTS

| | | | |
|---|---|---|---|
| 6,198,590 B1 * | 3/2001 | Codilian | G11B 19/20 360/75 |
| 8,618,791 B2 | 12/2013 | Grinberg et al. | |
| 9,746,925 B2 | 8/2017 | Yoest et al. | |
| 9,810,550 B2 | 11/2017 | Goto et al. | |
| 9,810,552 B2 | 11/2017 | Hunter et al. | |
| 9,995,715 B2 | 6/2018 | Goodbread | |
| 10,298,163 B2 * | 5/2019 | Vasilev | G08B 6/00 |
| 2014/0125471 A1 | 5/2014 | Organ et al. | |
| 2018/0059793 A1 | 3/2018 | Hajati | |
| 2018/0292235 A1 | 10/2018 | Filatov | |
| 2020/0412223 A1 | 12/2020 | Tarelli | |

\* cited by examiner

*Primary Examiner* — Antony M Paul
(74) *Attorney, Agent, or Firm* — Fish & Richardson P.C.

(57) ABSTRACT

A haptic engine includes a linear resonant actuator having a double-wound driving coil which is used for sensing a back electromotive force (EMF) voltage independently of the coil resistance, thus minimizing the back EMF voltage's sensitivity to temperature.

20 Claims, 6 Drawing Sheets

HAPTIC ACTUATOR HAVING A DOUBLE-WOUND DRIVING COIL FOR TEMPERATURE-INDEPENDENT VELOCITY SENSING

CROSS-REFERENCE TO RELATED APPLICATIONS

This application claims the benefit of priority of U.S. Provisional Patent Application No. 62/861,951, filed Jun. 14, 2019, which provisional patent application is incorporated by reference herein in its entirety.

BACKGROUND

Technical Field

This specification relates generally to haptic engine architectures, and more specifically, to a haptic engine having a haptic actuator in which velocity of the actuator's moving mass is sensed independently of temperature using the actuator's double-wound driving coil.

Background

A haptic engine (also referred to as a vibration module) includes a haptic actuator in which a mass is driven using electromagnetic forces to move relative the haptic actuator's frame, at least, along a driving direction (e.g., through vibration back-and-forth along the driving direction). A haptic actuator can be implemented as a linear resonant actuator (LRA), a gap-closing actuator, a rotary actuator, a reluctance motor, etc. The haptic engine also includes circuitry for actuating the haptic actuator, e.g., to produce the electromagnetic forces responsible for moving the mass, and circuitry for determining one or more of acceleration, velocity and displacement of the moving mass. The haptic actuator can be configured with a driving coil that is arranged stationary to the haptic actuator's frame, and a mass that supports a magnet and is arranged to move relative to the driving coil along the driving direction. Alternatively, the haptic actuator can be configured with a magnet that is arranged stationary to the haptic actuator's frame, and a mass that supports a driving coil and is arranged to move relative to the magnet along the driving direction. In either configuration, a back electromotive force voltage, or simply bEMF, induced in the driving coil, or simply coil, is related to the velocity of the moving mass in the following manner.

For instance, when the haptic actuator is implemented as a LRA, a driving force F is related to a driving current in the following manner:

$$F_{Eng} = k_m I \quad (1),$$

where $k_m$ is a motor constant, and I is a driving current through the coil. As such, the motor constant $k_m$ is measured in N/A and represents the actuator's efficiency. For instance, the rate of work performed by the driving force to move the magnet-carrying mass of an LRA with velocity v relative to the coil is due to the electromotive power induced in the coil:

$$vF_{Eng} = IV_{bEMF} \quad (2).$$

Based on EQs. (1) and (2), the bEMF is related to the velocity v of the mass in the following manner:

$$V_{bEMF} = k_m v \quad (3).$$

Thus, the relative velocity between the coil and magnet can be determined, based on EQ. (3), by calibrating the motor constant $k_m$ and sensing bEMF.

An equivalent electrical circuit of the LRA is shown schematically in FIG. 6. Ohm's law for this circuit at a time instance t is $$V_{drive}(t) = RI(t) + L\frac{dI(t)}{dt} + V_{bEMF}. \quad (4)$$

At a time t, $V_{drive}(t)$ is the voltage drop across the coil, L is the coil's inductance, R is the coil's resistance, and I(t) is the driving current in the coil. Since at haptic operational frequencies the inductive term is negligible, $$\frac{dI(t)}{dt} \to 0,$$

Ohm's law can be approximated as $$V_{drive}(t) = RI(t) + V_{bEMF} \quad (4').$$

Conventionally, the back EMF voltage, $V_{bEMF}$, can be extracted using EQ. (4') from the voltage drop across the two ends of the LRA's coil, $V_{drive}$, to track the state of the LRA, e.g., the instant velocity of the LRA's mass, by a controller. Thus, from EQs. (3) and (4'), the instant velocity of the mass is $$v = \frac{V_{bEMF}}{k_m} = \frac{V_{drive}(t) - RI(t)}{k_m}. \quad (5)$$

Using this approach, bEMF sensing requires good current and voltage real-time sensing capabilities, and also a-priori knowledge of the resistance of the coil under measurement. This is shown in FIG. 7, in which a given measurement point S in the (I,V)-space can be determined by sensing the instant driving voltage $V_{drive}(t)$ across the coil and the instant driving current I(t) through the coil. In accordance with EQ. (4'), a line drawn through the measurement point S and having a slope equal to the value of the coil's resistance R intersects the V-axis at a value equal to the instant bEMF induced in the coil.

The coil resistance knowledge is usually achieved through factory calibration.

However, factory calibration is sensitive to any changes happening during product lifetime, including temperature variations. For instance, the actual value of R is typically sensitive to the thermal effects caused by large driving currents during actuation. For copper coils temperature variation can cause a resistance delta of ~0.4%/deg C., which would lead to an unusable measurement within a few deg C. variation from factory temperature. These variations shown in FIG. 7 as different values of the slope of the line drawn through the measurement point S and in turn can cause corresponding variations in determining the bEMF induced in the coil.

Several solutions have been conventionally implemented to mitigate errors in bEMF sensing due to the noted temperature variations of the coil resistance. One solution makes use of use an external temperature sensor to track coil temperature. However, coil temperature can be very difficult to track in real-time, i.e., with low latency, due to heat transfer time constant and losses between coil and sensor. Also this solution relies on a precise knowledge of the coil temperature coefficient.

Another solution makes use of real-time impedance measurement tone. Here, a single tone signal is added on top of a haptic-intended playback, and the resistance is extracted from fft(V)/fft(I) at that frequency. A few drawbacks for this solution are enumerated below. With a conventional audio amplifier sampling rate (48-96 kHz), the measurement needs long settling time to achieve good signal-to-noise ratio (SNR). Also, the tone is likely to be in the audible range, causing an undesirable audible tone during the playback. Finally the resistance estimation tone will also increase power consumption without any force increase to the desired haptic playback.

Yet another solution makes use of a high impedance dummy coil. Here, another coil is added, and when the additional coil is driven at high impedance, i.e., with no current, it will provide a direct bEMF voltage measurement. However, the additional coil is not used for driving, and thus wastes a precious portion of the LRA's volume.

SUMMARY

In accordance with the disclosed technologies, a haptic engine includes a haptic actuator having a double-wound driving coil which is used for sensing a back EMF voltage without relying on the coil resistance, thus minimizing the back EMF voltage's sensitivity to temperature.

In general, one innovative aspect of the subject matter described in this specification can be embodied in a haptic engine that includes a frame; a first coil and a second coil wound together around a common core, the first coil and the second coil being thermally coupled with each other and mechanically coupled with the frame, the first coil having first terminals and the second coil having second terminals; a first driving source electrically coupled with the first coil at the first terminals to drive a first driving current through the first coil; a first voltage sensor electrically coupled with the first coil at the first terminals to sense a first driving voltage across the first coil; a second driving source electrically coupled with the second coil at the second terminals to drive a second driving current through the second coil, the first driving current and the second driving current having different values; a second voltage sensor electrically coupled with the second coil at the second terminals to sense a second driving voltage across the second coil; a mass supporting one or more permanent magnets, the mass arranged to be driven relative to the frame along a driving direction when the first driving current is driven through the first coil, and the second driving current is driven through the second coil; and computing circuitry configured to determine a velocity of the mass along the driving direction. The velocity is determined (i) independently of resistances of either the first coil or the second coil, and (ii) dependently of the first driving current through, and the first driving voltage over, the first coil, and the second driving current through, and the second driving voltage over, the second coil.

Other embodiments of this aspect include corresponding computing devices, each configured to perform operations or actions based on signals output by the disclosed haptic engine. For a device to be configured to perform particular operations or actions means that the device has installed on it software, firmware, hardware, or a combination of them that in operation cause the device to perform the operations or actions.

The foregoing and other embodiments can each optionally include one or more of the following features, alone or in combination. In particular, one implementation includes all the following features in combination. In some implementations, to determine the velocity, the computing circuitry is configured to (i) compute a first back electromotive force induced in the first coil or a second bEMF induced in the second coil, where each of the first bEMF and the second bEMF is computed independently of resistances of either the first coil or the second coil, and dependently of the first driving current through, and the first driving voltage over, the first coil, and the second driving current through, and the second driving voltage over, the second coil; and (ii) take a first ratio of the first bEMF to a first motor constant associated with the first coil, or a second ratio of the second bEMF to a second motor constant associated with the second coil. In some cases, when the first coil and the second coil are identical, the first bEMF and the second bEMF each has a value equal to a V-intercept of a line defined by a first point and a second point in the driving-current, driving voltage space, the first point having as coordinates the first driving current and the first driving voltage, while the second point having as coordinates the second driving current and the second driving voltage. In other cases, when the first coil and the second coil have different numbers of turns, each of the first bEMF and the second bEMF also depends of a ratio $$N = \frac{N_1}{N_2}$$

of the numbers of turns. In some cases, when the first driving current supplied through the first coil is zero, the first bEMF has a value equal to the first driving voltage sensed over the first coil, or when the second driving current supplied through the second coil is zero, the second bEMF has a value equal to the second driving voltage sensed over the second coil.

In some implementations, the first driving source and the second driving source are configured to drive the first driving current through the first coil and the second driving current through the second coil with frequencies in a frequency range of 10 Hz to 1 kHz, preferably 40 Hz to 300 Hz.

In any of the previous implementations, the first driving source and the second driving source are synchronized to drive the first driving current through the first coil and the second driving current through the second coil with the same frequency, and (i) when first and second coils are wound in the same direction, in phase relative to each other, or (ii) when first and second coils are wound in opposite directions, 180°-out-of-phase relative to each other.

In any of the previous implementations, the haptic engine can include an integrated circuit. In some cases, the integrated circuit can include (i) first driver circuitry comprising the first driving source configured as a first driving-current source to supply the first driving current through the first coil, (ii) first voltage/current sensing circuitry comprising the first voltage sensor and a first current sensor to sense respective values of the first driving voltage across, and the first driving current through, the first coil, (iii) second driver circuitry comprising the second driving source configured as a second driving-current source to supply the second driving current through the second coil, and (iv) second voltage/current sensing circuitry comprising the second voltage sensor and a second current sensor to sense respective values of the second driving voltage across, and the second driving current through, the second coil. Here, the computing circuitry is coupled with the first voltage/current sensing circuitry to receive respective values of the first driving voltage across, and the first driving current through, the first coil, and the second voltage/current sensing circuitry to receive respective values of the second driving voltage across, and the second driving current through, the second coil.

In other cases, the integrated circuit can include (i) first driver circuitry comprising (a) the first driving source configured as a first driving-current source to supply the first driving current through the first coil, and (b) a first current sensor to sense a value of the first driving current through the first coil, (ii) first voltage sensing circuitry comprising the first voltage sensor to sense a value of the first driving voltage across the first coil, (iii) second driver circuitry comprising (a) the second driving source configured as a second driving-current source to supply the second driving current through the second coil, and (b) a second current sensor to sense a value of the second driving current through the second coil, and (iv) second voltage sensing circuitry comprising the second voltage sensor to sense a value of the second driving voltage across the second coil. In some other cases, the integrated circuit can include (i) first driver circuitry comprising the first driving source configured as a first driving-voltage source to supply the first driving voltage across the first coil to induce the first driving current through the first coil, (ii) first voltage/current sensing circuitry comprising the first voltage sensor and a first current sensor to sense respective values of the first driving voltage across, and the first driving current through, the first coil, (iii) second driver circuitry comprising the second driving source configured as a second driving-voltage source to supply the second driving voltage across the second coil to induce the second driving current through the second coil, and (iv) second voltage/current sensing circuitry comprising the second voltage sensor and a second current sensor to sense respective values of the second driving voltage across, and the second driving current through, the second coil. In yet other cases, the integrated circuit can include (i) first driver circuitry comprising (a) the first driving source configured as a first driving-voltage source to supply the first driving voltage across the first coil to induce the first driving current through the first coil, and (b) the first voltage sensor to sense a value of the first driving voltage across the first coil, (ii) first current sensing circuitry comprising a first current sensor to sense a value of the first driving current through the first coil, (iii) second driver circuitry comprising (a) the second driving source configured as a second driving-voltage source to supply the second driving voltage across the second coil to induce the second driving current through the second coil, and (b) the second voltage sensor to sense a value of the second driving voltage across the second coil, and (iv) second current sensing circuitry comprising a second current sensor to sense a value of the second driving current through the second coil. In any of the previous cases, the integrated circuit is disposed either inside or outside the frame.

In some of the previous implementations, the computing circuitry is disposed either inside or outside the frame.

In some implementations, a device can include a haptic interface; the haptic engine of any one of the above implementations coupled with the haptic interface; and a controller coupled with the computing circuitry, the first driver circuitry, and the second driver circuitry. The controller is configured to (i) receive values of the velocity of the mass computed by the computing circuitry, (ii) receive or access a target value of the velocity of the mass, and (iii) cause, based on a comparison of the computed and target values of the velocity, adjustments of the first driving current driven by the first driving source to the first coil, and adjustments of the second driving current driven by the second driving source to the second coil. The device can be any one of a smartphone, a tablet, a laptop or a watch.

In general, another innovative aspect of the subject matter described in this specification can be embodied in methods for determining back electromagnetic force (bEMF) using a coil with two windings wound together around a common core. The methods include the actions of driving a first AC current through a first of the two windings; driving a second AC current through a second of the two windings, wherein the second AC current is different than the first AC current; sensing a first voltage across the first winding; sensing a second voltage across the second winding; and computing a first bEMF induced in the first winding or a second bEMF induced in the second winding. Each of the first bEMF and the second bEMF is computed (i) independently of resistances of either the first winding or the second winding, and (ii) dependently of the first AC current through, and the first voltage over, the first winding, and the second AC current through, and the second voltage over, the second winding.

The foregoing and other embodiments can each optionally include one or more of the following features, alone or in combination. In particular, one implementation includes all the following features in combination. In some implementations, driving the first AC current through the first of the two windings comprises supplying the first voltage across the first winding to induce the first AC current through the first winding, and driving the second AC current through the second of the two windings comprises supplying the second voltage across the second winding to induce the second AC current through the second winding. Here, the methods can additionally include sensing the first AC current through the first winding, and sensing the second AC current through the second winding.

In some implementations, driving the first AC current through the first of the two windings comprises supplying the first AC current through the first winding, and driving the second AC current through the second of the two windings comprises supplying the second AC current through the second winding. Here, the methods can additionally include sensing the first AC current through the first winding, and sensing the second AC current through the second winding. In some cases, the methods can include sensing the first AC current through the first winding, and sensing the second AC current through the second winding. Further, the methods can include (i) when the first AC current sensed through the first winding is zero, computing the first bEMF as the first voltage sensed over the first winding, or (ii) when the second AC current sensed through the second winding is zero, computing the second bEMF as the second voltage sensed over the second winding.

In any of the previous implementations, the methods can include, when the first winding and the second winding are identical, computing the first bEMF or the second bEMF as a V-intercept of a line defined by a first point and a second point in the (I,V)-space. The first point has as coordinates the first AC current and the first voltage, while the second point has as coordinates the second AC current and the second voltage, in accordance with EQ. (8). Here, the methods can include (i) when the first voltage supplied across the first winding is zero, computing the first bEMF or the second bEMF in accordance with EQ. (8'), and (ii) when the second voltage supplied across the second winding is zero, computing the first bEMF or the second bEMF in accordance with EQ. (8").

In any of the previous implementations, when the first winding and the second winding have different numbers of turns, each of the first bEMF and the second bEMF is computed dependently of a ratio $$N = \frac{N_1}{N_2}$$

of the number of turns, in accordance with EQs. (11) and (9c). Here, the methods can include (i) when the first voltage supplied across the first winding is zero, computing the second bEMF in accordance with the following expression x, and (ii) when the second voltage supplied across the second winding is zero, computing the second bEMF in accordance with EQs. (11) and (9c), in which $V_2=0$.

In some implementations, the first AC current through the first winding and the second AC current through the second winding are driven with frequencies in a frequency range of 10 Hz to 1 kHz, preferably 40 Hz to 300 Hz.

In some implementations, the methods can include synchronizing the driving of the first AC current through the first winding and the second AC current through the second winding, such that the first AC current and the second AC current are driven with the same frequency and (i) when first and second coils are wound in the same direction, in phase relative to each other, or (ii) when first and second coils are wound in opposite directions, 180°-out-of-phase relative to each other.

The subject matter described in this specification can be implemented in particular embodiments so as to realize one or more of the following advantages. For example, values of the back EMF voltage induced in the haptic actuator's double-wound driving coil, and/or values of the velocity of the haptic actuator's mass are independent of the double-wound driving coil's impedance value(s). As such, the disclosed technologies are robust against temperature variations, while reducing or eliminating accuracy requirements for factory impedance calibration.

Further, in accordance with the disclosed technologies, there is no need for a real-time impedance measurement, which leads to eliminating settling time associated with such a conventional approach measurements. Furthermore, the need to add an extra tone to playback is avoided by using the disclosed technologies, which leads to eliminating additional acoustic noise and power consumption associated with such a conventional approach of adding an extra tone to playback. Additionally, no volume of the haptic actuator is wasted by a dummy coil, since both windings of the disclosed double-wound driving coil are used for driving. Thus, the haptic actuator's mass can be driven more effectively when both windings contribute to driving the mass compared to the conventional case in which only one of two coils is used for driving, since one the dummy coil is used only for sensing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
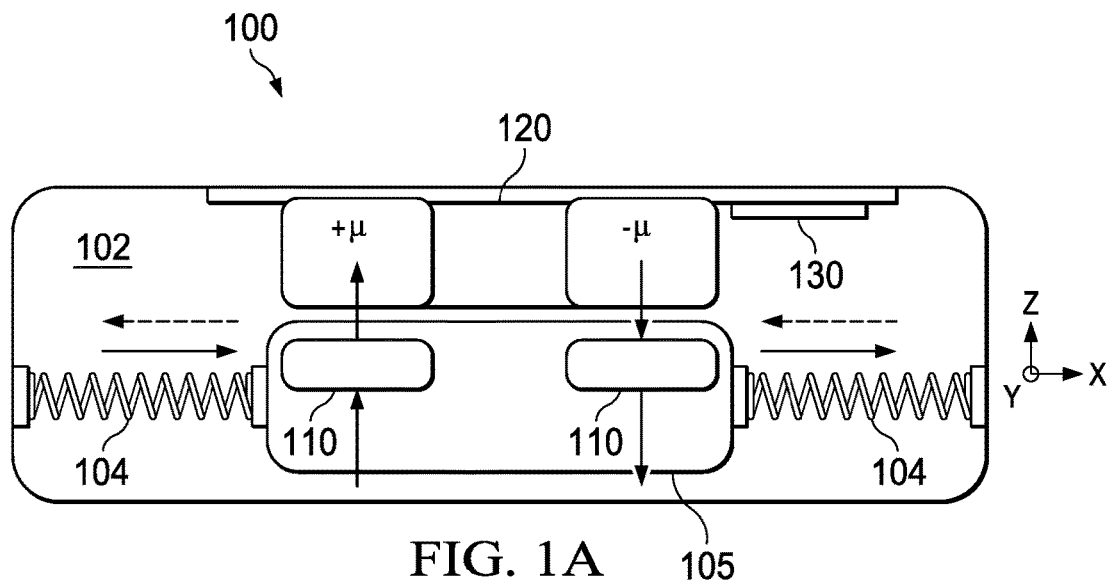
FIGS. 1A-1C show aspects of an example of a haptic actuator having a double-wound driving coil.

FIG. 1A is a cross-section view, e.g., in the (x,z)-plane, of an example of a haptic actuator 100 that includes a double-wound driving coil 120. In the example illustrated in FIG. 1A, the haptic actuator 100 is implemented as a LRA, so the term LRA will be used interchangeably for the term haptic actuator. However, the technologies described herein can be applied when the haptic actuator 100 is implemented as a rotary actuator.

The haptic actuator 100 also includes a permanent magnet 110, such that the double-wound driving coil 120 and the magnet 110 are movable relative to each other. The haptic actuator 100 has a frame 102 that encapsulates a mass 105 arranged and configured to move relative the frame 102, at least, along the x-axis (e.g., through vibration left-and-right on page). Here, the double-wound driving coil 120 is mechanically coupled with (i.e., affixed to) the frame 102, and the mass 105 is configured as a cage with enclosures that hold portion of the magnet 110.

Figure 1B:
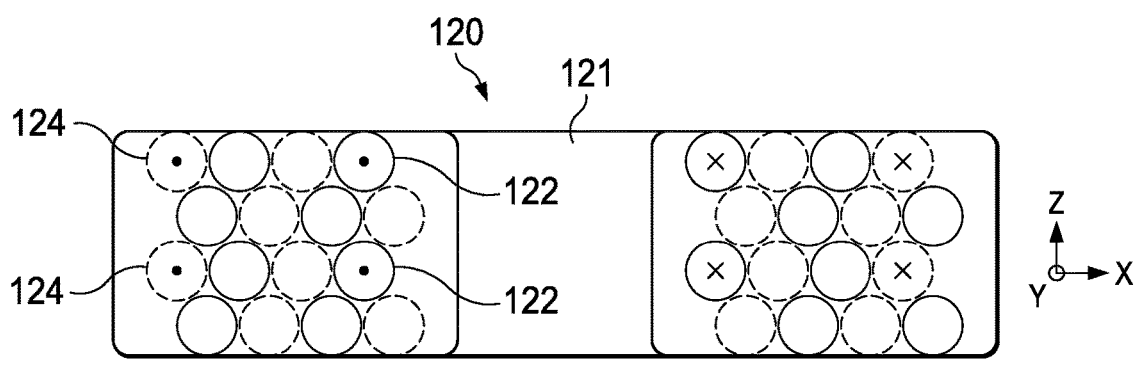
Figure 1C:
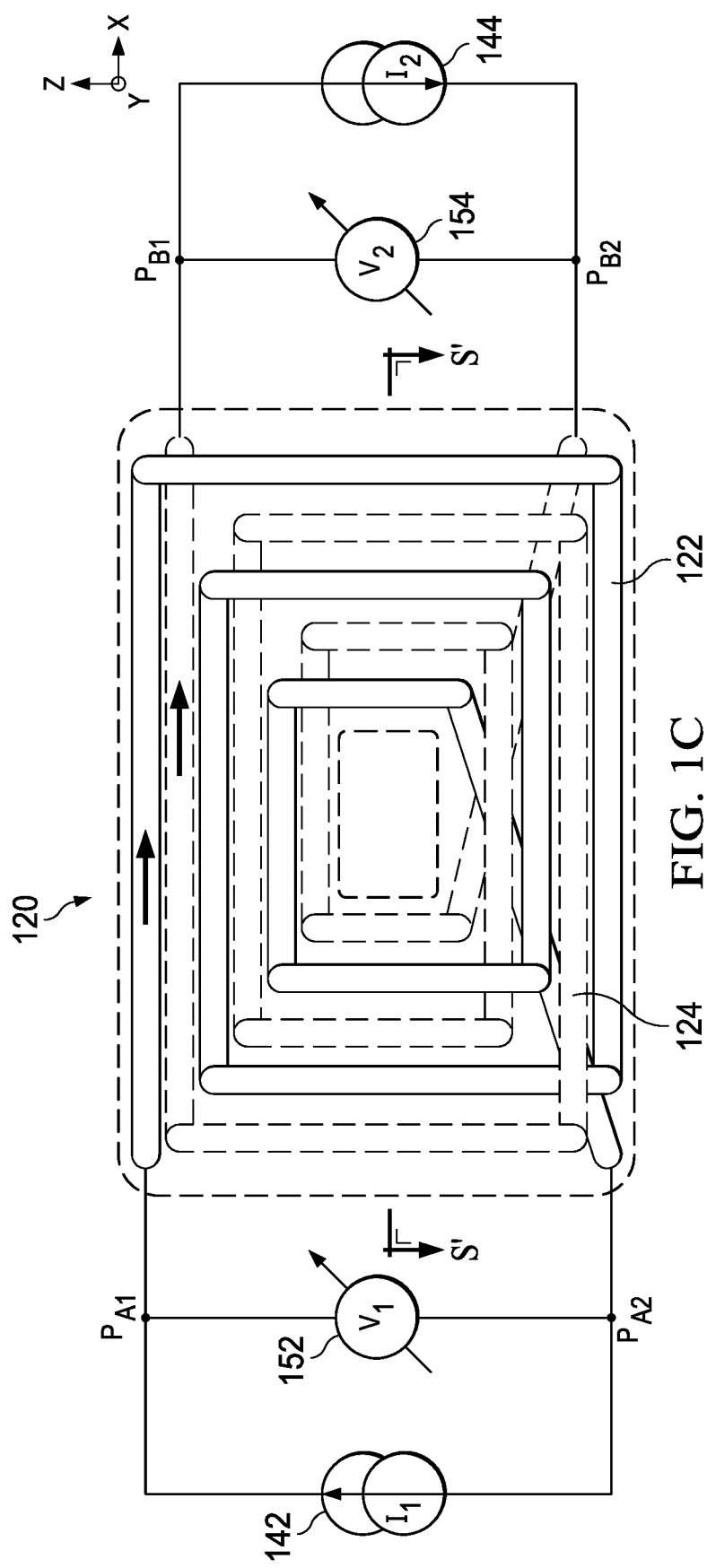

FIG. 1B shows a close-up cross-section view of the double-wound driving coil 120 in the (x,z)-plane, and FIG. 1C shows a plan-view of the double-wound driving coil 120, e.g., in the (x,y)-plane. The double-wound driving coil 120 includes a first coil 122 (also referred to as the first winding) and a second coil 124 (also referred to as the second winding). The first coil (122) has first terminals $P_{A1}$, $P_{A2}$, and the second coil 124 has second terminals $P_{B1}$, $P_{B2}$. As shown in FIGS. 1B-1C, the first coil 122 and the second coil 124 are wound together around a common core 121. In this manner, the first coil 122 and the second coil 124 are thermally, as well as magnetically, matched with each other. Thus, the thermal matching of the first coil 122 and the second coil 124 ensures that they will be at substantially the same temperature whether or not driving currents are provided there through. The magnetic matching ensures that the magnetic field flux per turn will be the same for both coils. In this way the ratio between the motor constant of the two coils will be consistent during the whole operation of the haptic actuator, independently from the magnet position relative to the coils. In some cases, the first coil 122 and the second coil 124 are identical, e.g., they have the same number of turns $N_1$, $N_2$, such that a ratio $$N = \frac{N_1}{N_2}$$

of the number of turns is equal to 1. In other cases, the first coil 122 and the second coil 124 are different from each other, e.g., they have different numbers of turns, such that the ratio N of the number of turns is different from 1.

Driving and sensing circuitry for actuating the haptic actuator 100 can be integrated in a driver integrated circuit (IC) 130. In the example shown in FIG. 1A, the driver IC 130 is disposed inside the frame 102. However, the driver IC can also be disposed inside the frame 102. In the example shown in FIG. 1C, driving and sensing circuitry includes a first driving-current source 142, a first voltage sensor 152, a second driving-current source 144, and a second voltage sensor 154. Here, the first driving-current source 142 is electrically coupled with the first coil 122 at the first terminals $P_{A1}$, $P_{A2}$ to supply a first driving current $I_1$ through the first coil 122. The first voltage sensor 152 is electrically coupled with the first coil 122 at the first terminals $P_{A1}$, $P_{A2}$ to sense a first driving voltage $V_1$ across the first coil 122. The second driving-current source 144 is electrically coupled with the second coil 124 at the second terminals $PB_1$, $PB_2$ to supply a second driving current $I_2$ through the second coil 124. As explained in detail below in connection with FIG. 3, the first driving-current source 142 and the second driving-current source 144 are configured to provide respective first driving current $I_1$ and second driving current $I_2$ having different values. Finally, the second voltage sensor 154 is electrically coupled with the second coil 124 at the second terminals $P_{B1}$, $P_{B2}$ to sense a second driving voltage $V_2$ across the second coil 124.

Figure 2:
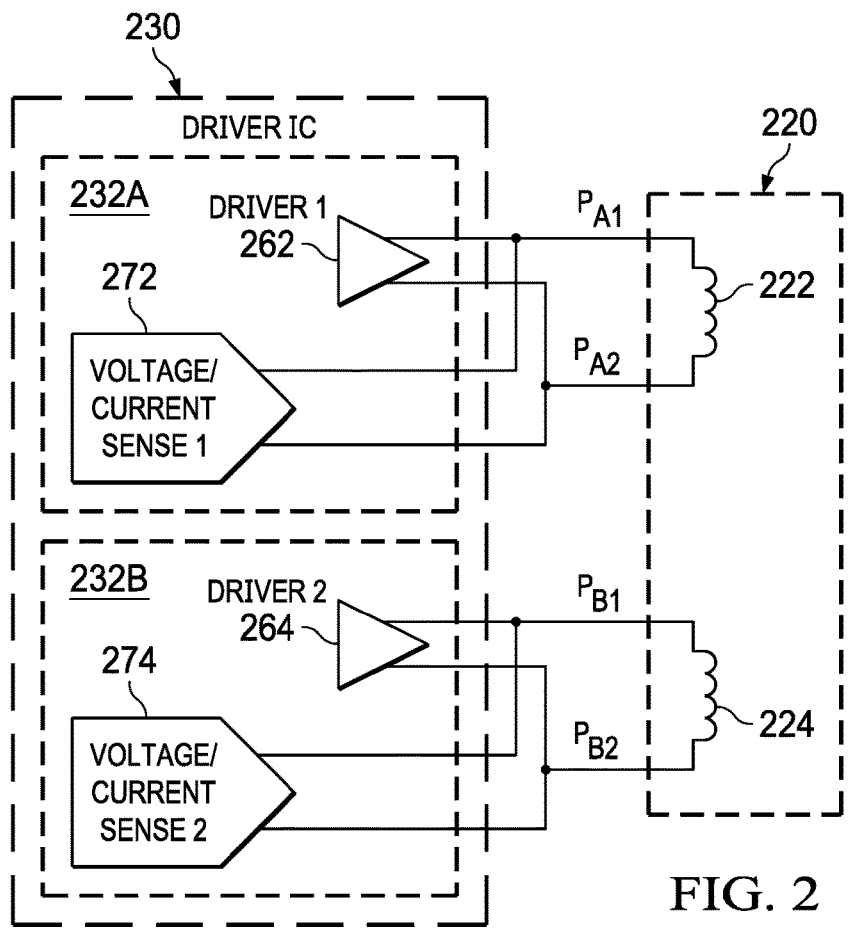
FIG. 2 is a schematic electrical diagram of driving circuitry coupled with a haptic actuator having a double-wound driving coil.

FIG. 2 is schematic electrical diagram of driving and sensing circuitry coupled with a haptic actuator's double-wound driving coil 220, for instance, similar to the double-wound driving coil 120. In the example shown in FIG. 2, first and second driving/sensing channels 232A, 232B are integrated together in a driver IC 230 that includes first driver circuitry 262 and first voltage/current sensing circuitry 272, each coupled with the first coil 222 at the first terminals $P_{A1}$, $P_{A2}$, and second driver circuitry 264 and second voltage/current sensing circuitry 274 each coupled with the second coil 224 at the second terminals $P_{B1}$, $P_{B2}$. In another example, not shown in FIG. 2, the first driving/sensing channel 232A can be implemented as a first driver IC that includes the first driver circuitry 262 and the first voltage/current sensing circuitry 272, each to be coupled with the first coil 222 at the first terminals $P_{A1}$, $P_{A2}$. And, the second driving/sensing channel 232B, can be implemented on a separate, second driver IC that includes the second driver circuitry 264 and the second voltage/current sensing circuitry 274, each to be coupled with the second coil 224 at the second terminals $P_{B1}$, $P_{B2}$. Note that the example of integration shown in FIG. 2 ensures that the first and second driving/sensing channels 232A, 232B occupy a smaller footprint within the haptic actuator, as a single driver IC 230, compared to the noted example integration in which each of the first and second driving/sensing channels 232A, 232B are implemented separately, in its own driver IC.

In some implementations, the first driver circuitry 262 includes a first driving-current source (e.g., 142) to supply a first driving current $I_1$ through the first coil 222, and the first voltage/current sensing circuitry 272 includes at least a first voltage sensor (e.g., 152) to sense a first driving voltage $V_1$ across the first coil 222. The second driver circuitry 264 includes a second driving-current source (e.g., 144) to supply a second driving current $I_2$ through the second coil 224, and the second voltage/current sensing circuitry 274 includes at least a second voltage sensor (e.g., 154) to sense a second driving voltage $V_2$ across the second coil 224. In such implementations, the first driving/sensing channel 232A also includes a first current sensor to sense the first driving current $I_1$ through the first coil 222. The first current sensor can be implemented as part of the first driver circuitry 262, or as part of the first voltage/current sensing circuitry 272. Here, the second driving/sensing channel 232B also includes a second current sensor to sense the second driving current $I_2$ through the second coil 224. The second current sensor can be implemented as part of the second driver circuitry 264, or as part of the second voltage/current sensing circuitry 274.

In other implementations, the first driver circuitry 262 includes a first driving-voltage source to supply a first driving voltage $V_1$ across the first coil 222, and the first voltage/current sensing circuitry 272 includes at least a first current sensor to sense a first driving current $I_1$ through the first coil 222 caused by the first driving voltage $V_1$. The second driver circuitry 264 includes a second driving-voltage source to supply a second driving voltage $V_2$ across the second coil 224, and the second voltage/current sensing circuitry 274 includes at least a second current sensor to sense a second driving current $I_2$ through the second coil 224 caused by the second driving voltage $V_2$. In such implementations, the first driving/sensing channel 232A also includes a first voltage sensor (e.g., 152) to sense the first driving voltage $V_1$ across the first coil 222. The first voltage sensor (e.g., 152) can be implemented as part of the first driver circuitry 262, or as part of the first voltage/current sensing circuitry 272. Here, the second driving/sensing channel 232B also includes a second voltage sensor (e.g., 154) to sense the second driving voltage $V_2$ across the second coil 224. The second voltage sensor (e.g., 154) can be implemented as part of the second driver circuitry 264, or as part of the second voltage/current sensing circuitry 274.

Referring again to FIG. 1A, the mass 105 of the LRA 100 is arranged to be driven relative to the frame 102 along the driving direction when the first driving current $I_1$ is being supplied through the first coil 122, and the second driving current $I_2$ is being supplied through the second coil 124. Here, a left portion of the magnet 110 is oriented with its north pole towards the top of the page and its south pole towards the bottom of the page, and a right portion of the magnet 110 is oriented with its north pole towards the bottom of the page and its south pole towards the top of the page. As shown in FIG. 1B, left sections of the first coil 122 and the second coil 124 have flow of the first driving current $I_1$ and second driving current $I_2$ along the negative y-axis (here, out of the page), while right sections of the first coil 122 and the second coil 124 have the opposite flow of the first driving current $I_1$ and second driving current 12 along the positive y-axis (here, into the page). As such, the double-wound driving coil 120 including the first coil 122 and the second coil 124 experiences a Lorentz force to the left of the page and the magnet 110, along with the mass 105, will move towards the right of the page. In this manner, alternating (i.e., driving) currents $I_1$ and $I_2$, which are provided through the first coil 122 and the second coil 124, respectively, cause a periodic Lorentz force that drives, along the x-axis, the mass 105 including the magnet 110. Springs 104 are used to couple the mass 105 to the frame 102, and are arranged and configured to return the mass 105 at its equilibrium position by opposing the noted periodic Lorentz force. Only two lines of a spatial distribution of a magnetic field emitted by the combination of double-wound driving coil 120 and magnet 110 is shown in FIG. 1A.

The driving currents $I_1$ and $I_2$ are provided through the first coil 122 and the second coil 124, respectively, in a manner that ensures that the Lorentz forces, caused by the respective driving currents $I_1$ and $I_2$, enforce each other. For embodiments of the double-wound driving coil 120 in which the first coil 122 and the second coil 124 are wound together in the same direction, e.g., both in clock-wise directions or both in counter-clock-wise directions, the first driving current $I_1$ and second driving current $I_2$ will be driven in phase, as indicated in FIGS. 1B-1C. For embodiments of the double-wound driving coil 120 in which the first coil 122 and the second coil 124 are wound together in opposite directions, e.g., one in clock-wise directions and the other one in counter-clock-wise direction, the first driving current $I_1$ and second driving current $I_2$ will be driven in 180° out-of-phase. In either of the foregoing embodiments, the first driving current $I_1$ and second driving current $I_2$ are driven with the same frequency. A frequency of the first driving current $I_1$ and second driving current $I_2$ is in an operational frequency range of 10 Hz to 1 kHz, e.g., 30 Hz to 300 Hz. An amplitude and frequency of the velocity v of the mass 105 is proportional to respective amplitude and frequency of the first and second driving currents $I_1$ and $I_2$ provided through the double-wound driving coil 120, as explained below.

Note that cases in which the first coil 122 has $N_1$ turns and the second coil 124 has $N_2$ turns, where the ratio of the number of turns $$N = \frac{N_1}{N_2} = 1,$$

are discussed first. In such cases, the first coil 122 and the second coil 124 are said to be identical from the stand point of their resistances, $$R_1 = R_2 = R \tag{6a}.$$

Also, since the haptic actuator 100 is, in the example shown in FIG. 1A, implemented as an LRA, the first coil 122 and the second coil 124 are said to be identical from the stand point of their motor constants, $$k_{m_1} = k_{m_2} = k_m \tag{6b}.$$

Since the identical first and second coils 122, 124 have the same motor constant, the back EMF voltages induced in them have the same value, $$V_{bEMF_1} = V_{bEMF_2} = V_{bEMF} \tag{6c}.$$

In accordance with EQs. (4'), (6a) and (6c), $$V_{bEMF} = V_1 - I_1 R \tag{7a},$$

$$V_{bEMF} = V_2 - I_2 R \tag{7b}.$$

A bEMF-computing module, e.g., computing circuitry such as a digital signal processor (DSP), can be coupled with the first voltage/current sensing circuitry 272 to receive respective values of the first driving voltage $V_1$ across, and the first driving current $I_1$ through, the first coil 122, and with the second voltage/current sensing circuitry 274 to receive respective values of the second driving voltage $V_2$ across, and the second driving current $I_2$ through, the second coil 124. Such a bEMF-computing module is configured to solve the system of EQs. (7a), (7b) can be solved to determine the value of the back EMF voltage induced in each of the identical first and second coils 122, 124 as $$V_{bEMF} = \frac{I_2 V_1 - I_1 V_2}{I_2 - I_1}. \tag{8}$$

The noted bEMF-computing module is configured to determine a value of the velocity v of the mass 105 of the LRA 100 by substituting in EQ. (5) the values of the motor constant $k_m$ from EQ. (6b) and the value of the back EMF voltage from EQ. (8). Note that the first driving-current source 142 and the second driving-current source 144 are configured to provide respective first driving current $I_1$ and second driving current $I_2$ that have different values to ensure that the denominator of EQ. (8) is different from zero. In this manner, if the two coils are identical, then real-time bEMF sensing will be achieved independent from the first and second coils 122, 124 resistances.

Figure 3:
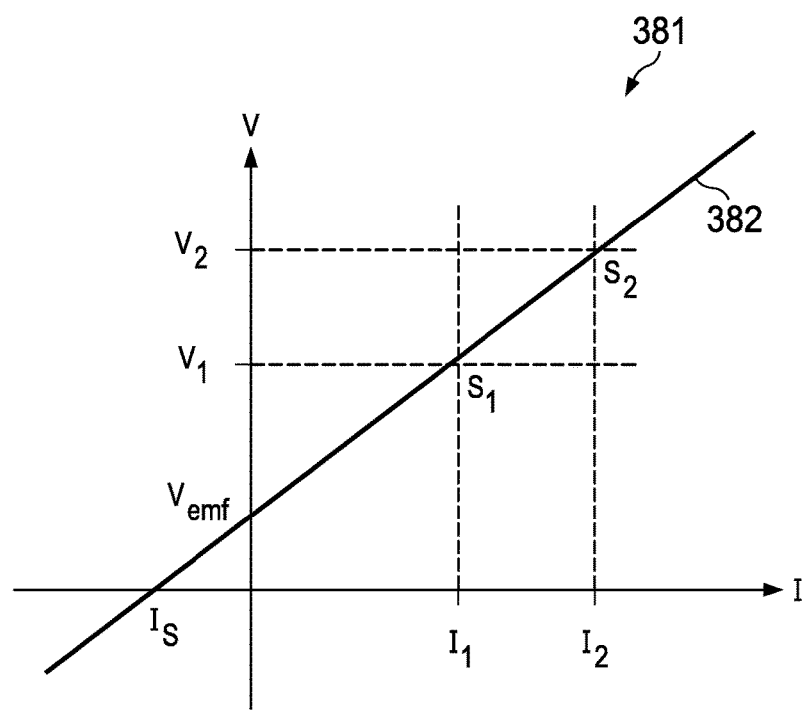
FIG. 3 shows aspects of determining bEMF induced in a double-wound driving coil included in a haptic actuator implemented as an LRA.

FIG. 3 shows the (I,V)-measurement space 381 in which a first measurement point $S_1$ has coordinates corresponding to the values of the first driving current $I_1$ and the first driving voltage $V_1$, and a second measurement point $S_2$ has coordinates corresponding to the values of the second driving current $I_2$ and the second driving voltage $V_2$. Note that the back EMF voltage obtained in accordance with EQ. (8) corresponds to a value of a V-intercept of a line 382 defined by the first measurement point $S_1$ and second measurement point $S_2$.

Cases in which the first coil 122 has $N_1$ turns and the second coil 124 has $N_2$ turns, where the ratio of the number of turns $$N = \frac{N_1}{N_2} \neq 1,$$

are discussed next. In such cases, the first coil 122 and the second coil 124 are said to be different from the stand point of their resistances, $$R_1 = NR_2 \tag{9a},$$

and also different from the stand point of their motor constants, $$k_{m_1} = Nk_{m_2} \tag{9b}.$$

Since the first coil 122 and second coil 124 have motor constants that are different by a factor N, the back EMF voltages induced therein are different in the same manner, $$V_{bEMF_1} = NV_{bEMF_2} \tag{9c}.$$

In accordance with EQs. (4'), (9a) and (9c), $$NV_{bEMF_2} = V_1 - I_1 NR_2 \tag{10a},$$

$$V_{bEMF_2} = V_2 - I_2 R_2 \tag{10b}.$$

The noted bEMF-computing module is configured to solve the system of EQs. (10a), (10b) to determine the value of the back EMF voltage for the second coil 124 as $$V_{bEMF_2} = \frac{\frac{I_2 V_1}{N} - I_1 V_2}{I_2 - I_1} \tag{11}$$

The noted bEMF-computing module is configured to determine a value of the velocity v of the mass 105 of the LRA 100 by substituting in EQ. (5) the value of the motor constant $k_{m_B}$ associated with the second coil and the value of the back EMF voltage induced in the second coil 124 determined based on EQ. (11).

$$v = \frac{V_{bEMF_2}}{k_{m_2}}. \tag{12}$$

Note once again that the first driving-current source 142 and the second driving-current source 144 are configured to provide respective first driving current $I_1$ and second driving current $I_2$ that have different values to ensure that the denominator of EQ. (11) is different from zero. In this manner, if the two coils are different by N number of turns, then real-time bEMF sensing will be achieved dependent only on the ratio of the number of turns N of the first and second coils 122, 124.

Note that the techniques for determining the back EMF voltage induced in the windings 122, 124 of the double-wound driving coil 120, and the velocity of the mass 105, of the LRA 100 can be implemented in a similar manner in a LRA that includes a multi-stage driving system. An LRA of this type includes an array of two or more driving coils. At least one of the driving coils of the array has two windings arranged and configured as the double-wound driving coil 120, while each of the remaining one or more driving coils of the array has one winding arranged and configured as a single-wound driving coil. The noted array of two or more driving coils is disposed on, and mechanically coupled with (i.e., affixed to), the frame of this type of LRA. For instance, the array of two or more driving coils can be disposed on a surface of the LRA frame parallel to the (x,y)-plane, such that their magnetic axes are normal to the (x,y)-plane and distributed along the driving direction, e.g., along the x-axis. Here, the Lorentz forces caused by currents driven in the at least one double-wound driving coil 120 and the respective one or more single-wound driving coils enforce each other to cause a stronger, and/or more controllable, vibration of the LRA's mass. The at least one double-wound driving coil 120 of the array is accompanied by corresponding circuitry 262/272 and 264/274, and each of the one or more single-wound driving coils is accompanied by corresponding driving/sensing circuitry. Based on the equations discussed above—here corresponding to the at least one double-wound driving coil 120 of the array—a value of the velocity of the LRA's mass will be determined.

Figure 4:
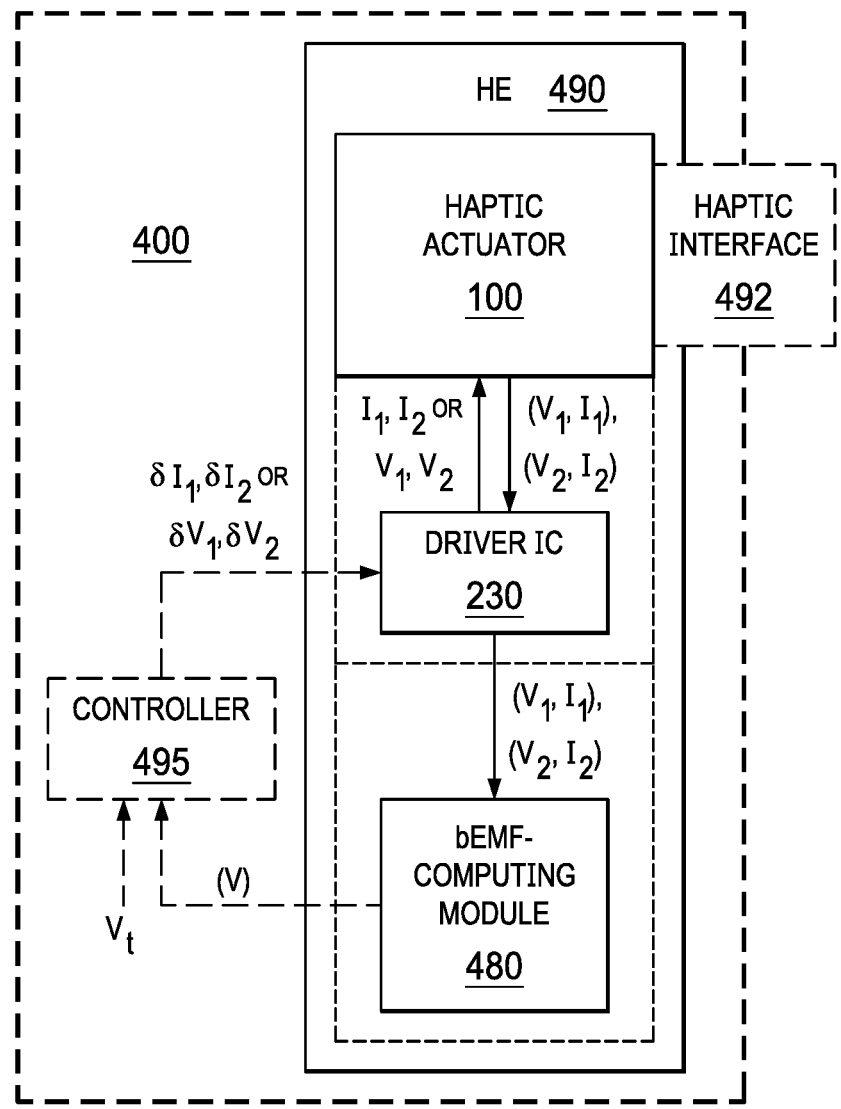
FIG. 4 is an example computing device architecture that uses a haptic engine including the disclosed haptic actuator.

FIG. 4 shows a haptic engine 490 which includes the haptic actuator 100, the driver IC 230, and the above-noted bEMF-computing module, here having the reference numeral 480. Note that, depending on the implementation, both, one, or none of the driver IC 230 and the bEMF-computing module 480 are disposed inside the frame 102 of the haptic actuator 100. Correspondingly, none, one, or both of the driver IC 230 and the bEMF-computing module 480 can be disposed inside the frame 102 of the haptic actuator 100.

As described above, the driver IC 230 is configured to supply, or drive using respective driving voltages $V_1$, $V_2$, depending on the implementation of the driver circuitry 262, 264, different first and second driving currents $I_1$, $I_2$ to the first and second coils 122, 124, respectively, of the double-wound driving coil 120 of the haptic actuator 100. Further, the driver IC 230 is configured to sense, and then transmit to the bEMF-computing module 480, the respective values of the first driving voltage $V_1$ across, and the first driving current $I_1$ through, the first coil 122, and with the second voltage/current sensing circuitry 274 to receive respective values of the second driving voltage $V_2$ across, and the second driving current $I_2$ through, the second coil 124.

When the haptic actuator 100 is implemented as an LRA (e.g., like in FIG. 1A), the bEMF-computing module 480 is configured to determine the back EMF voltage induced in the first and second coils 122, 124 in accordance with EQ. (8) if the first and second coils 122, 124 are identical coils, or EQ. (11) if the first and second coils 122, 124 have respective numbers of turns that are different by a factor of N. As noted above, the bEMF-computing module 480 is configured to determine the velocity of the mass 105 of the LRA 100 by dividing the determined back EMF voltage induced in one of the first and second coils 122, 124 by a value of the motor constant of the corresponding coil.

FIG. 4 also shows that the haptic engine 490 can be integrated in a device 400, for instance a smartphone, a tablet, a laptop or a watch. In the example illustrated in FIG. 3, the device 400 includes a haptic interface 492, and the haptic engine 490 is part of, or coupled with, the haptic interface 492. In this manner, vibration of the mass 105 cause the haptic interface 492 to produce a specified vibration.

The device 400 includes a controller 495, e.g., a CPU, an ASIC, etc., configured to receive, e.g., from an app executed or accessed by the device 400, a target velocity signal, denoted in FIG. 4 as $v_t$, corresponding to a vibration to be produced by the haptic interface 492. Here, the controller 495 is coupled with both the driver IC 230 and the bEMF-computing module 480 of the haptic engine 490. The bEMF-computing module 480 is configured to transmit to the controller 495 the velocity signal v determined by the bEMF-computing module 480 and corresponding to the instant velocity of the mass 105 of the haptic actuator 100. In this example, the controller 495 is configured to compare the determined velocity signal v to the target velocity signal $v_t$. And to instruct the driver IC 230, based on the comparison, to implement either current adjustments $\delta I_1$ of the first driving current $I_1$ supplied by the first driver circuitry 262 to the first coil 122, and current adjustments $\delta I_2$ of the second driving current $I_2$ supplied by the second driver circuitry 264 to the second coil 122, or voltage adjustments $\delta V_1$ of the first driving voltage $V_1$ supplied by the first driver circuitry 262 across the first coil 122, and voltage adjustments $\delta V_2$ of the second driving voltage $V_2$ supplied by the second driver circuitry 264 across the second coil 122, depending on the implementation of the driver circuitry 262, 264.

In summary, the disclosed haptic engines (e.g., 490) include a haptic actuator (e.g., implemented as the LRA 100) having a coil (e.g., 120) with two windings (e.g., 122, 124) wound together around a common core 121, and methods for determining bEMF using the disclosed haptic engines. The disclosed methods include supplying a first AC current (e.g., $I_1$) through a first (e.g., 122) of the two windings; supplying a second AC current (e.g., 12) through a second (e.g., 124) of the two windings, where the second AC current ($I_2$) is different than the first AC current ($I_1$); sensing a first voltage (e.g., $V_1$) across the first winding (e.g., 122); sensing a second voltage (e.g., $V_2$) across the second winding (e.g., 124); and computing a first bEMF induced in the first winding (e.g., 122) or a second bEMF induced in the second winding (e.g., 124), wherein each of the first bEMF and the second bEMF is computed independently of resistances of either the first winding or the second winding, and dependently of the first AC current through, and the first voltage over, the first winding, and the second AC current through, and the second voltage over, the second winding.

It was shown that, when the first winding and the second winding are identical, the disclosed methods include computing, as shown in FIG. 3, the first bEMF or the second bEMF as a V-intercept of a line (e.g., 382) defined by a first point (e.g., $S_1$) and a second point (e.g., $S_2$) in the (I,V)-space (e.g., 381). Here, the first point has as coordinates the first AC current and the first voltage, while the second point has as coordinates the second AC current and the second voltage, in accordance with EQ. (8).

Further it was shown that, in accordance with the disclosed methods, when the first winding and the second winding have different numbers of turns (e.g., $N_1$, $N_2$), each of the first bEMF and the second bEMF is computed dependently of a ratio $$N = \frac{N_1}{N_2}$$

of the number of turns, in accordance with EQ. (11).

Note that, based on FIG. 3, when the first AC current supplied through the first winding is zero, the disclosed methods include computing the first bEMF as the first voltage sensed over the first winding. Alternatively, when the second AC current supplied through the second winding is zero, the disclosed methods include computing the second bEMF as the second voltage sensed over the second winding. These correspond to situations when the first and second driver circuitries 262, 264 include respective driving-current sources 142, 144, and one of the driving-current sources 142, 144 is inactive, i.e., either $I_1 \neq I_2 = 0$, or $I_2 \neq I_1 = 0$.

Consider next situations when the first and second driver circuitries 262, 264 include respective driving-voltage sources. As shown in FIG. 3, in a first situation when the first driving-voltage source is shorted, i.e., $V_1 = 0$ and $I_1 = I_S$, the first driving current through the first winding is caused by the bEMF induced over the shorted first winding. Here, the disclosed methods include (i) applying to the second winding a second driving voltage, which ensures that the second driving current induced in the second winding is different from the first driving current through the shorted first winding, $I_2 \neq I_S$, and (ii) computing the bEMF induced in each of the first and second windings of the coil based on EQ. (8) in the following manner $$V_{bEMF} = \frac{I_S V_2}{I_S - I_2}. \tag{8'}$$

Also as shown in FIG. 3, in a second situation when the second driving-voltage source is shorted, i.e., $V_2 = 0$ and $I_2 = I_S$, the second driving current through the second winding is caused by the bEMF induced over the shorted second winding. Here, the disclosed methods include (i) applying to the first winding a first driving voltage, which ensures that the first driving current induced in the first winding is different from the second driving current through the shorted second winding, $I_1 \neq I_S$, and (ii) computing the bEMF induced in each of the first and second windings of the coil based on EQ. (8) in the following manner $$V_{bEMF} = \frac{I_S V_1}{I_S - I_1}. \tag{8''}$$

Figure 5:
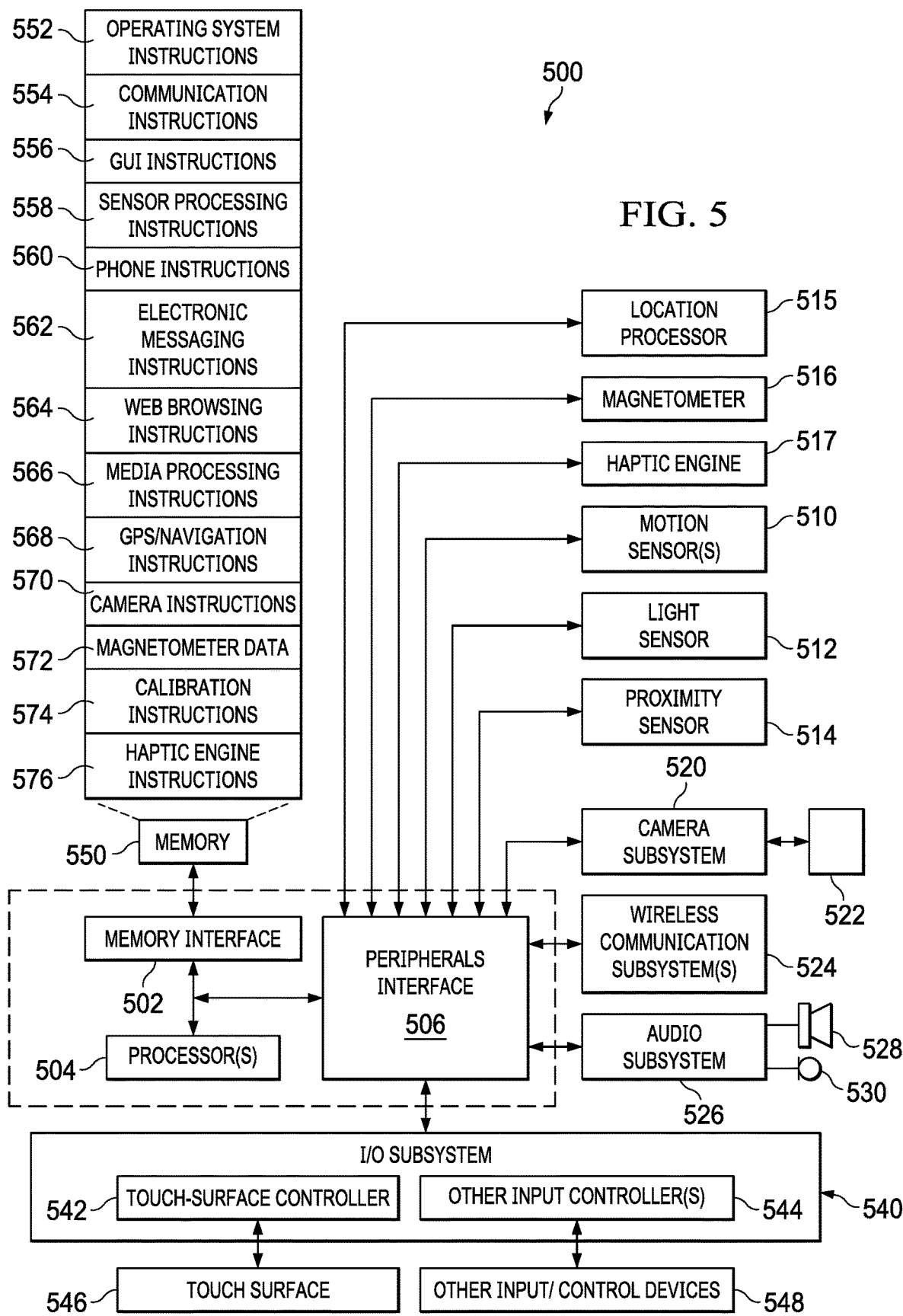
FIG. 5 is an example of mobile device architecture that uses a haptic engine including the disclosed haptic actuator, according to an embodiment.
Figure 6:
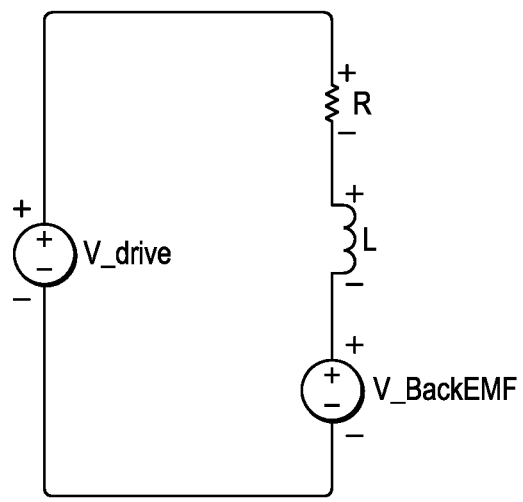
FIGS. 6-7 show aspects of determining bEMF induced in a driving coil in accordance with a conventional approach.
Figure 7:
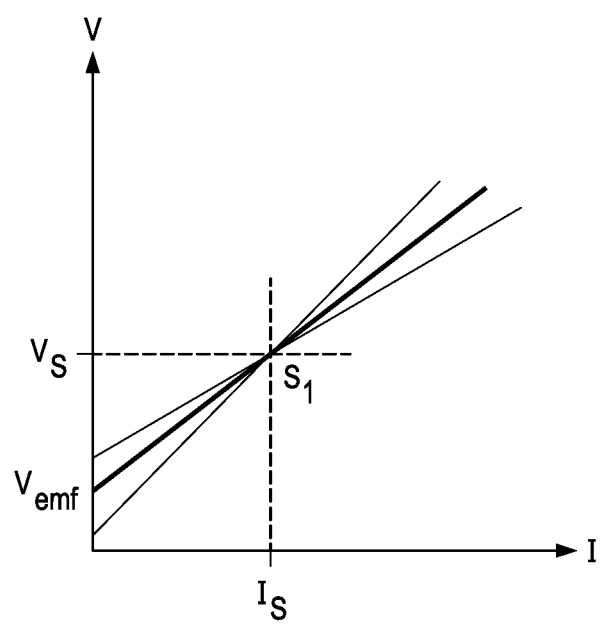

FIG. 5 is a diagram of an example of mobile device architecture that uses the haptic engine 490 described in reference to FIGS. 1-4, according to an embodiment. Architecture 500 may be implemented in any mobile device for generating the features and processes described in reference to FIGS. 1-4, including but not limited to smart phones and wearable computers (e.g., smart watches, fitness bands). Architecture 500 may include memory interface 502, data processor(s), image processor(s) or central processing unit(s) 504, and peripherals interface 506. Memory interface 502, processor(s) 504 or peripherals interface 506 may be separate components or may be integrated in one or more integrated circuits. One or more communication buses or signal lines may couple the various components.

Sensors, devices, and subsystems may be coupled to peripherals interface 506 to facilitate multiple functionalities. For example, motion sensor(s) 510, light sensor 512, and proximity sensor 514 may be coupled to peripherals interface 506 to facilitate orientation, lighting, and proximity functions of the device. For example, in some embodiments, light sensor 512 may be utilized to facilitate adjusting the brightness of touch surface 546. In some embodiments, motion sensor(s) 510 (e.g., an accelerometer, rate gyroscope) may be utilized to detect movement and orientation of the device. Accordingly, display objects or media may be presented according to a detected orientation (e.g., portrait or landscape).

Haptic engine 517, under the control of haptic engine instructions 572, provides the features and performs the processes described in reference to FIGS. 1-4, such as, for example, implementing haptic feedback (e.g., vibration). Haptic engine 517 can include one or more actuators, such as piezoelectric transducers, electromechanical devices, and/or other vibration inducing devices, which are mechanically connected to an input surface (e.g., touch surface 46). Drive electronics (e.g., 170) coupled to the one or more actuators cause the actuators to induce a vibratory response into the input surface, providing a tactile sensation to a user touching or holding the device.

Other sensors may also be connected to peripherals interface 506, such as a temperature sensor, a barometer, a biometric sensor, or other sensing device, to facilitate related functionalities. For example, a biometric sensor can detect fingerprints and monitor heart rate and other fitness parameters. In some implementations, a Hall sensing element in haptic engine 517 can be used as a temperature sensor.

Location processor 515 (e.g., GNSS receiver chip) may be connected to peripherals interface 506 to provide geo-referencing. Electronic magnetometer 516 (e.g., an integrated circuit chip) may also be connected to peripherals interface 506 to provide data that may be used to determine the direction of magnetic North. Thus, electronic magnetometer 516 may be used to support an electronic compass application.

Camera subsystem 520 and an optical sensor 522, e.g., a charged coupled device (CCD) or a complementary metal-oxide semiconductor (CMOS) optical sensor, may be utilized to facilitate camera functions, such as recording photographs and video clips.

Communications functions may be facilitated through one or more communication subsystems 524. Communication subsystem(s) 524 may include one or more wireless communication subsystems. Wireless communication subsystems 524 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and embodiment of the communication subsystem 524 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 524 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 526 may be coupled to a speaker 528 and one or more microphones 530 to facilitate voice-enabled functions, such as voice recognition, voice replication, digital recording, and telephony functions. In an embodiment, audio subsystem includes a digital signal processor (DSP) that performs audio processing, such as implementing codecs.

I/O subsystem 540 may include touch controller 542 and/or other input controller(s) 544. Touch controller 542 may be coupled to a touch surface 546. Touch surface 546 and touch controller 542 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 546. In one embodiment, touch surface 546 may display virtual or soft buttons and a virtual keyboard, which may be used as an input/output device by the user.

Other input controller(s) 544 may be coupled to other input/control devices 548, such as one or more buttons, rocker switches, thumb-wheel, infrared port, USB port, and/or a pointer device such as a stylus. The one or more buttons (not shown) may include an up/down button for volume control of speaker 528 and/or microphone 530.

In some embodiments, device 500 may present recorded audio and/or video files, such as MP3, AAC, and MPEG video files. In some embodiments, device 500 may include the functionality of an MP3 player and may include a pin connector for tethering to other devices. Other input/output and control devices may be used.

Memory interface 502 may be coupled to memory 550. Memory 550 may include high-speed random access memory or non-volatile memory, such as one or more magnetic disk storage devices, one or more optical storage devices, or flash memory (e.g., NAND, NOR). Memory 550 may store operating system 552, such as Darwin, RTXC, LINUX, UNIX, OS X, iOS, WINDOWS, or an embedded operating system such as VxWorks. Operating system 552 may include instructions for handling basic system services and for performing hardware dependent tasks. In some embodiments, operating system 552 may include a kernel (e.g., UNIX kernel).

Memory 550 may also store communication instructions 554 to facilitate communicating with one or more additional devices, one or more computers or servers, including peer-to-peer communications. Communication instructions 554 may also be used to select an operational mode or communication medium for use by the device, based on a geographic location (obtained by the GPS/Navigation instructions 568) of the device.

Memory 550 may include graphical user interface instructions 556 to facilitate graphic user interface processing, including a touch model for interpreting touch inputs and gestures; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS (e.g., GPS, GLOSSNAS) and navigation-related processes and functions; camera instructions 570 to facilitate camera-related processes and functions; and haptic engine instructions 572 for commanding or controlling haptic engine 517 and to provide the features and performing the processes described in reference to FIGS. 1-4.

Each of the above identified instructions and applications may correspond to a set of instructions for performing one or more functions described above. These instructions need not be implemented as separate software programs, procedures, or modules. Memory 550 may include additional instructions or fewer instructions. Furthermore, various functions of the device may be implemented in hardware and/or in software, including in one or more signal processing and/or application specific integrated circuits (ASICs). Software instructions may be in any suitable programming language, including but not limited to: Objective-C, SWIFT, C#and Java, etc.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination. Logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A haptic engine comprising:
   a frame;
   a first coil and a second coil wound together around a common core, the first coil and the second coil being thermally coupled with each other and mechanically coupled with the frame, the first coil having first terminals and the second coil having second terminals;
   a first driving source electrically coupled with the first coil at the first terminals to drive a first driving current through the first coil;

a first voltage sensor electrically coupled with the first coil at the first terminals to sense a first driving voltage across the first coil;

a second driving source electrically coupled with the second coil at the second terminals to drive a second driving current through the second coil, the first driving current and the second driving current having different values;

a second voltage sensor electrically coupled with the second coil at the second terminals to sense a second driving voltage across the second coil;

a mass supporting one or more permanent magnets, the mass arranged to be driven relative to the frame along a driving direction when the first driving current is driven through the first coil, and the second driving current is driven through the second coil; and computing circuitry configured to determine a velocity of the mass along the driving direction, the velocity determined independently of resistances of either the first coil or the second coil, and dependently of the first driving current through, and the first driving voltage over, the first coil, and the second driving current through, and the second driving voltage over, the second coil.

2. The haptic engine of claim 1, wherein to determine the velocity, the computing circuitry is configured to compute a first back electromotive force (bEMF) induced in the first coil or a second bEMF induced in the second coil, wherein each of the first bEMF and the second bEMF is computed independently of resistances of either the first coil or the second coil, and dependently of the first driving current through, and the first driving voltage over, the first coil, and the second driving current through, and the second driving voltage over, the second coil, and take a first ratio of the first bEMF to a first motor constant associated with the first coil, or a second ratio of the second bEMF to a second motor constant associated with the second coil.

3. The haptic engine of claim 2, wherein, when the first coil and the second coil are identical, the first bEMF and the second bEMF each has a value equal to a V-intercept of a line defined by a first point and a second point in the driving-current, driving voltage space, the first point having as coordinates the first driving current and the first driving voltage, while the second point having as coordinates the second driving current and the second driving voltage.

4. The haptic engine of claim 2, wherein, when the first coil and the second coil have different numbers of turns, each of the first bEMF and the second bEMF also depends of a ratio $$N = \frac{N_1}{N_2}$$

of the numbers of turns.

5. The haptic engine of claim 2, wherein, when the first driving current supplied through the first coil is zero, the first bEMF has a value equal to the first driving voltage sensed over the first coil, or when the second driving current supplied through the second coil is zero, the second bEMF has a value equal to the second driving voltage sensed over the second coil.

6. The haptic engine of claim 1, wherein the first driving source and the second driving source are configured to drive the first driving current through the first coil and the second driving current through the second coil with frequencies in a frequency range of 10 Hz to 1 kHz, preferably 40 Hz to 300 Hz.

7. The haptic engine of claim 1, wherein the first driving source and the second driving source are synchronized to drive the first driving current through the first coil and the second driving current through the second coil with a same frequency, and (i) when first and second coils are wound in a same direction, in phase relative to each other, or (ii) when first and second coils are wound in opposite directions, 180°-out-of-phase relative to each other.

8. The haptic engine of claim 1, comprising an integrated circuit, wherein the integrated circuit comprises first driver circuitry comprising the first driving source configured as a first driving-current source to supply the first driving current through the first coil, first voltage/current sensing circuitry comprising the first voltage sensor and a first current sensor to sense respective values of the first driving voltage across, and the first driving current through, the first coil, second driver circuitry comprising the second driving source configured as a second driving-current source to supply the second driving current through the second coil, and second voltage/current sensing circuitry comprising the second voltage sensor and a second current sensor to sense respective values of the second driving voltage across, and the second driving current through, the second coil.

9. The haptic engine of claim 8, wherein the computing circuitry is coupled with the first voltage/current sensing circuitry to receive respective values of the first driving voltage across, and the first driving current through, the first coil, and the second voltage/current sensing circuitry to receive respective values of the second driving voltage across, and the second driving current through, the second coil.

10. The haptic engine of claim 8, wherein the integrated circuit is disposed either inside or outside the frame.

11. The haptic engine of claim 1, comprising an integrated circuit, wherein the integrated circuit comprises first driver circuitry comprising (a) the first driving source configured as a first driving-current source to supply the first driving current through the first coil, and (b) a first current sensor to sense a value of the first driving current through the first coil, first voltage sensing circuitry comprising the first voltage sensor to sense a value of the first driving voltage across the first coil, second driver circuitry comprising (a) the second driving source configured as a second driving-current source to supply the second driving current through the second coil, and (b) a second current sensor to sense a value of the second driving current through the second coil, and second voltage sensing circuitry comprising the second voltage sensor to sense a value of the second driving voltage across the second coil.

12. The haptic engine of claim 1, comprising
an integrated circuit, wherein the integrated circuit comprises
  first driver circuitry comprising the first driving source configured as a first driving-voltage source to supply the first driving voltage across the first coil to induce the first driving current through the first coil,
  first voltage/current sensing circuitry comprising the first voltage sensor and a first current sensor to sense respective values of the first driving voltage across, and the first driving current through, the first coil,
  second driver circuitry comprising the second driving source configured as a second driving-voltage source to supply the second driving voltage across the second coil to induce the second driving current through the second coil, and
  second voltage/current sensing circuitry comprising the second voltage sensor and a second current sensor to sense respective values of the second driving voltage across, and the second driving current through, the second coil.

13. The haptic engine of claim 1, comprising
an integrated circuit, wherein the integrated circuit comprises
  first driver circuitry comprising (a) the first driving source configured as a first driving-voltage source to supply the first driving voltage across the first coil to induce the first driving current through the first coil, and (b) the first voltage sensor to sense a value of the first driving voltage across the first coil,
  first current sensing circuitry comprising a first current sensor to sense a value of the first driving current through the first coil,
  second driver circuitry comprising (a) the second driving source configured as a second driving-voltage source to supply the second driving voltage across the second coil to induce the second driving current through the second coil, and (b) the second voltage sensor to sense a value of the second driving voltage across the second coil, and
  second current sensing circuitry comprising a second current sensor to sense a value of the second driving current through the second coil.

14. The haptic engine of claim 1, wherein the computing circuitry is disposed either inside or outside the frame.

15. A method for determining back electromagnetic force (bEMF) using a coil with two windings wound together around a common core, the method comprising:
  driving a first AC current through a first of the two windings;
  driving a second AC current through a second of the two windings, wherein the second AC current is different than the first AC current;
  sensing a first voltage across the first winding;
  sensing a second voltage across the second winding; and
  computing a first bEMF induced in the first winding or a second bEMF induced in the second winding, wherein each of the first bEMF and the second bEMF is computed
    independently of resistances of either the first winding or the second winding, and
    dependently of the first AC current through, and the first voltage over, the first winding, and the second AC current through, and the second voltage over, the second winding.

16. The method of claim 15, wherein
driving the first AC current through the first of the two windings comprises supplying the first voltage across the first winding to induce the first AC current through the first winding,
driving the second AC current through the second of the two windings comprises supplying the second voltage across the second winding to induce the second AC current through the second winding, and
the method further comprises
  sensing the first AC current through the first winding, and
  sensing the second AC current through the second winding.

17. The method of claim 15, wherein
driving the first AC current through the first of the two windings comprises supplying the first AC current through the first winding,
driving the second AC current through the second of the two windings comprises supplying the second AC current through the second winding, and
the method further comprises
  sensing the first AC current through the first winding, and
  sensing the second AC current through the second winding.

18. The method of claim 17, comprising
sensing the first AC current through the first winding, and
sensing the second AC current through the second winding.

19. The method of claim 18, comprising
when the first AC current sensed through the first winding is zero, computing the first bEMF as the first voltage sensed over the first winding, or
when the second AC current sensed through the second winding is zero, computing the second bEMF as the second voltage sensed over the second winding.

20. The method of claim 15, comprising, when the first winding and the second winding are identical, computing the first bEMF or the second bEMF as a V-intercept of a line defined by a first point and a second point in the (I,V)-space, wherein the first point has as coordinates the first AC current and the first voltage, while the second point has as coordinates the second AC current and the second voltage, in accordance with the following expressions:

$$bEMF_1 = bEMF_2 = \frac{I_2 V_1 - I_1 V_2}{I_2 - I_1}.$$

* * * * *